(12) United States Patent
Dubey et al.

(10) Patent No.: US 6,625,330 B1
(45) Date of Patent: Sep. 23, 2003

(54) METHOD FOR CONTROLLED AND MEANINGFUL SHAPE MODIFICATIONS

(75) Inventors: Pradeep Kumar Dubey, New Delhi (IN); Sugata Ghosal, New Delhi (IN); Ashutosh Kulshreshtha, New Delhi (IN); Abhinanda Sarkar, Calcutta (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/516,142

(22) Filed: Mar. 1, 2000

(51) Int. Cl.[7] .................................................. G06K 9/32
(52) U.S. Cl. ........................ 382/293; 382/195; 382/295
(58) Field of Search ................................ 382/293, 295, 382/195, 288; 700/251

(56) References Cited

U.S. PATENT DOCUMENTS 5,581,665 A * 12/1996 Sugiura et al. ................ 395/86
5,870,493 A * 2/1999 Vogl et al. .................... 382/195

FOREIGN PATENT DOCUMENTS

JP          402042305 A * 2/1990  ........... G01B/11/24

OTHER PUBLICATIONS

Arbter et al., "Application of Affine–Invariant Fourier Descriptors to Recognition of 3–D Objects", IEEE Transactions on Pattern Analysis and Machine Intelligence, vol. 12, No. 7, Jul. 1990, pp. 640–644.*
Terasawa, "Rendering Objects with Small Elements Based on Their Micro and Macro Structures", IEEE, Computer Graphics International, Jun. 1998, pp. 268–272.*
Fujimura et al., "Shape Signature by Deformation", IEEE, Shape Modeling and Applications, Mar. 1999, pp. 225–232, 279.*
DeCarlo et al., "Blended Deformable Models", IEEE, Transactions on Pattern Analysis and Machine Intelligence, vol. 18, No. 4, Apr. 1996, pp. 443–448.*
Sclaroff et al., "Modal Matching for Correspondence and Recognitin", IEEE Transactions on Pattern Analysis and Machine Intelligence, vol. 17, No. 6, Jun. 1995, pp. 545–561.*
Mehrotra et al., "Similar–Shape Retrieval In Shape Data Management", IEEE vol. 28, No. 9, Sep. 1995, pp. 57–62.*

* cited by examiner

*Primary Examiner*—Anh Hong Do
(74) *Attorney, Agent, or Firm*—Whitman, Curtis & Christofferson, P.C.; T. Roa Coca

(57) ABSTRACT

A method of doing meaningful modifications on an image is presented. These modifications can then be used in variety of applications related to image shape manipulation and similar shape retrieval. The method extracts macrofeatures and microfeature from a given shape. Deformations are done on the macrofeatures only. These deformations are either predefined, or are taken from a deformation library, or are calculated from the shape itself, The microfeatures are then added to the deformed macrofeatures to get a deformed shape. The shape deformations then allow user's perception of shape similarity to be learned, which is reflected in the values of parameters in a parameterized shape similarity metric. The user can use one of the deformed shapes as the initial query point, instead of the shape he or she started with. The shape database compression is achieved by storing only the identification of a similar shape and value of global deformations which will generate this shape approximately, instead of storing every shape feature individually.

14 Claims, 8 Drawing Sheets

METHOD FOR CONTROLLED AND MEANINGFUL SHAPE MODIFICATIONS

BACKGROUND OF THE INVENTION

1. Field of the Invention

The present invention generally relates to the field of graphics and image processing and, more particularly, to controlled and meaningful shape modifications. This shape modification has potential applications in the field of user assisted image manipulation and in the framework of information search and retrieval with emphasis on retrieving images which contain objects of shape similar to the query object shape.

2. Background Description

One of the classical dilemmas of content based image retrieval schemes concerns the choice between what the system thinks the user is interested in and what the user is actually interested in. It is the intent of search procedures to elicit responses from the user that reduce this dilemma. The computer usually stores the features of the image in some numerical form, and the search is performed according to some measure of similarity between the query image, with which the user starts the search, and the images stored in a database. The difference between user's subjective notion of similarity and the objective similarity function used by the computer gives rise to this inconsistency.

There is a need to provide users with choices that they may not have realized were available. For example, if a user expresses an interest in a graphical object, how should a search engine broaden the scope of the search? One possibility is to devise a query scheme eliciting further responses to related stimuli, both graphical and otherwise.

In our view, a better approach is to modify the original graphical stimulus in multiple directions and learn through the user's responses such modifications. Our approach is thus bottom up, instead of top down. In the process, we can develop a tool by which human visual perception can be learned both in user-free (common architectures for image retrieval) and user-driven (learning algorithms from user perceptions) dimensions. This composite view of learning from images is what the present invention is about.

Many systems implement ways of retrieving images based on the similarity of the shape of an object of interest in the query image. The images in the database are segmented, and each segment is assumed to correspond to an object. The shape of an object is given by the region which encloses the object and is stored in the database as the points on the boundary. Sometimes features of interest are derived from these points, joining which we can get the polygonal approximation to the shape. These points could be the high-curvature points on the boundary. In similar-shape retrieval systems, the search is performed by starting with an image, segmenting it and choosing a particular segment from that image, or with a sketch which the user draws. We shall call this the query shape. A general overview of similar-shape retrieval systems is given in "Similar-Shape Retrieval in Shape Data Management", by Rajiv Mehrotra and James E Gary, in *IEEE Computer Magazine*, 28(9), September 1995.

The shape of the object is represented in some numerical form. Most commonly used shape representations include region-based descriptors like moment invariants, or boundary-based Fourier descriptors. Details and references to the methods of Moment invariants and Fourier descriptors for the shape can be found in the book *Digital Image Processing* by R. C. Gonzalez and R. E. Woods, Addison-Wesley. Early references to Fourier descriptors can be found in "Fourier descriptors for plane closed curves", by C. Zahn and R. Roskies, *IEEE Trans. on Comput.*, vol. C-21, no. 3, March 1972. Given a shape representation scheme, two shapes are compared for closeness using some similarity measure. The similarity measure inputs two shape representative numerical vectors and outputs one number, which gives the closeness of the two shapes.

SUMMARY OF THE INVENTION

We first describe the invention in the specific context of modifying a single shape. For the technical purposes of this description, a shape is the boundary of the two-dimensional image of an object. A shape is coded as an ordered sequence of two-dimensional points. We can find these points of interest on the boundary of the object by taking, for example, the high-curvature points, joining which we can get a polygonal approximation of the object shape. In our invention we shall assume that the original shape has N interest points and this ordered set of points is written as complex numbers $(x_1, x_2, \ldots, x_N)$. We shall suppose that we have at our disposal an algorithm that can extract a shape that the user finds interesting and compute this set.

At the center of our invention is the distinction made between two kinds of features this shape may have.

1. Macrofeatures: We give this name to features that characterize the entire shape. For example, a tree has a trunk and branches as macrofeatures. Transformations of the shape that transform these macrofeatures are termed-global deformations.

2. Microfeatures: We give this name to features that describe only a region of the shape. In the example of the tree, the arrangement of leaves on a branch is a microfeature and differs from branch to branch. Such features are transformed by local deformations.

We have devised a strategy to distinguish between these two classes of features and deformations.

Step 1: Describe or represent the shape in a suitable coordinate system. The choice of this coordinate system (or basis) is central to the invention and will be further discussed for a specific implementation.

Step 2: In the new coordinate system, the macrofeatures are captured by the first few coordinates with the remaining representing microfeatures. Precisely how many coordinates represent macrofeatures can be user-driven or defined by some class that the shape belongs to.

Step 3: Once we have the shape feature projections onto the macrofeature dimensions and the microfeature dimensions, we deform the macrofeatures. These deformations are global deformation. Then we combine the microfeature to the deformed macrofeature to get the deformed object. This is the principal contribution of the invention.

Steps 1 to 3 are described mathematically as follows:

The coordinates of the points of the shape can be written in terms of basis vectors of another coordinate system as follows, $$\begin{bmatrix} x_i \\ y_i \end{bmatrix} = \sum_{j=1}^{n} \begin{bmatrix} a_{ij}^{xx} & a_{ij}^{xy} \\ a_{ij}^{yx} & a_{ij}^{yy} \end{bmatrix} \begin{bmatrix} b_j^x \\ b_j^y \end{bmatrix}, \quad i = 1, \ldots, n,$$

where the basis vectors are $$b_j = \begin{bmatrix} b_j^x \\ b_j^y \end{bmatrix}, \quad j = 1, \ldots, n.$$

Macrofeatures (global) are features of the shape, which are given by $$\begin{bmatrix} x_i^{(g)} \\ y_i^{(g)} \end{bmatrix} = \sum_{j=1}^{m} \begin{bmatrix} a_{ij}^{xx} & a_{ij}^{xy} \\ a_{ij}^{yx} & a_{ij}^{yy} \end{bmatrix} \begin{bmatrix} b_j^x \\ b_j^y \end{bmatrix},$$

where m(<n) indicates the number of macrofeatures.

Microfeatures (local) are features of the shape, which are given by $$\begin{bmatrix} x_i^{(l)} \\ y_i^{(l)} \end{bmatrix} = \sum_{j=m+1}^{n} \begin{bmatrix} a_{ij}^{xx} & a_{ij}^{xy} \\ a_{ij}^{yx} & a_{ij}^{yy} \end{bmatrix} \begin{bmatrix} b_j^x \\ b_j^y \end{bmatrix}, \quad i = 1, \ldots, n.$$

The macrofeatures are deformed to $$\begin{bmatrix} \tilde{x}_i^{(g)} \\ \tilde{y}_i^{(g)} \end{bmatrix} = \sum_{j=1}^{m} \begin{bmatrix} \tilde{a}_{ij}^{xx} & \tilde{a}_{ij}^{xy} \\ \tilde{a}_{ij}^{yx} & \tilde{a}_{ij}^{yy} \end{bmatrix} \begin{bmatrix} b_j^x \\ b_j^y \end{bmatrix}, \quad i = 1, \ldots, n.$$

The shape then is deformed to $$\begin{bmatrix} \tilde{x}_i \\ \tilde{y}_i \end{bmatrix} = \begin{bmatrix} \tilde{x}_i^{(g)} \\ \tilde{y}_i^{(g)} \end{bmatrix} + \begin{bmatrix} x_i^{(l)} \\ y_i^{(l)} \end{bmatrix}, \quad i = 1, \ldots, n.$$

A prime candidate for a coordinate system is the Fourier basis. Use of this basis in a visual system is suitable when visual symmetry is of prime concern. The representation of the shape in the Fourier basis can use the techniques similar to the ones used in extracting the Fourier descriptors of the shape. A method to find Fourier descriptors of a polygon given by ordered set of complex numbers $(x_1, x_2, \ldots, x_N)$ is given in "Application of Affine-Invariant Fourier Descriptor to Recognition of 3-D Objects", by Maus Arbter, Wesley E. Snyder, Hans Burkhardt and Gerd Hirzinger, *IEEE Transactions on Pattern Analysis and Machine Intelligence*, Vol. 12, No. 7, July 1990.

We first represent the shape in terms of its Fourier coefficients. Once we have a Fourier representation of the shape, we can characterize macrofeatures by a few of the Fourier coefficients. If we consider only one Fourier coefficient, which represents the center of the object, the macrofeature represents only the position. If we additionally consider two more Fourier coefficients, then the macrofeatures are all captured by a transformed circle. In such a case, area, orientation and aspect ratio also become macrofeatures. More detail can be added by considering more pairs of Fourier coefficients. FIG. 8 illustrates the macrofeatures with increasing number of Fourier coefficients. Applying a template filter, which is low-pass filter in this case, we divide the set of Fourier coefficients into two parts. The first, which passes through the low-pass filter, represents the macrofeatures, and the second, the "residual", represents the microfeatures of the shape. The bandwidth of the low-pass filter is, in our system, a user-tunable or a system specified parameter and defines the appropriate macrofeature-microfeature separation for the shape.

Once we have the shape represented by only macrofeatures, we can apply deformations to them so as to capture the user's perception of changes to the global aspects of the shape. These deformations can be taken from a library of currently available deformations. For example, if we take three Fourier parameters, which describes the position, area, orientation and aspect ratio of the object. We can, for example, use finite element methods that deform using a physical structure for the background of the shape, as described in "Modal matching for correspondence and vision", by S. Sclaroff and A. Pentland, in *IEEE Transactions on Pattern Analysis and Machine Intelligence*, vol. 17, pp. 545–561, June 1995.

An alternative way of describing our invention involves letting the macrofeatures define the template filter. Transformations and deformations are on this template only and not on the microfeatures. This view of our invention also allows us the use of partial or sub-sampled templates. The advantage we gain from this strategy is twofold:

(i) we enlarge the class of templates without additional visual input, and (ii) we can enforce visual and other symmetries even if they are not built into the deformations being used.

The sub-sampling scheme can be automated by a natural use of multiresolutions if a dyadic (power of two) number of points define the shape.

Once the global deformations are made to the macrofeatures, the microfeatures are added back in to restore the shape. If required, we allow for some "smoothing" by local deformations, but the principal purpose of this phase of the invention is to leave local features intact. For example, deforming macrofeatures of a tree can simulate the effects of a windy day. Retaining microfeatures ensures that the leaves are still associated with their branches as in the undisturbed tree and not themselves deformed out of shape.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
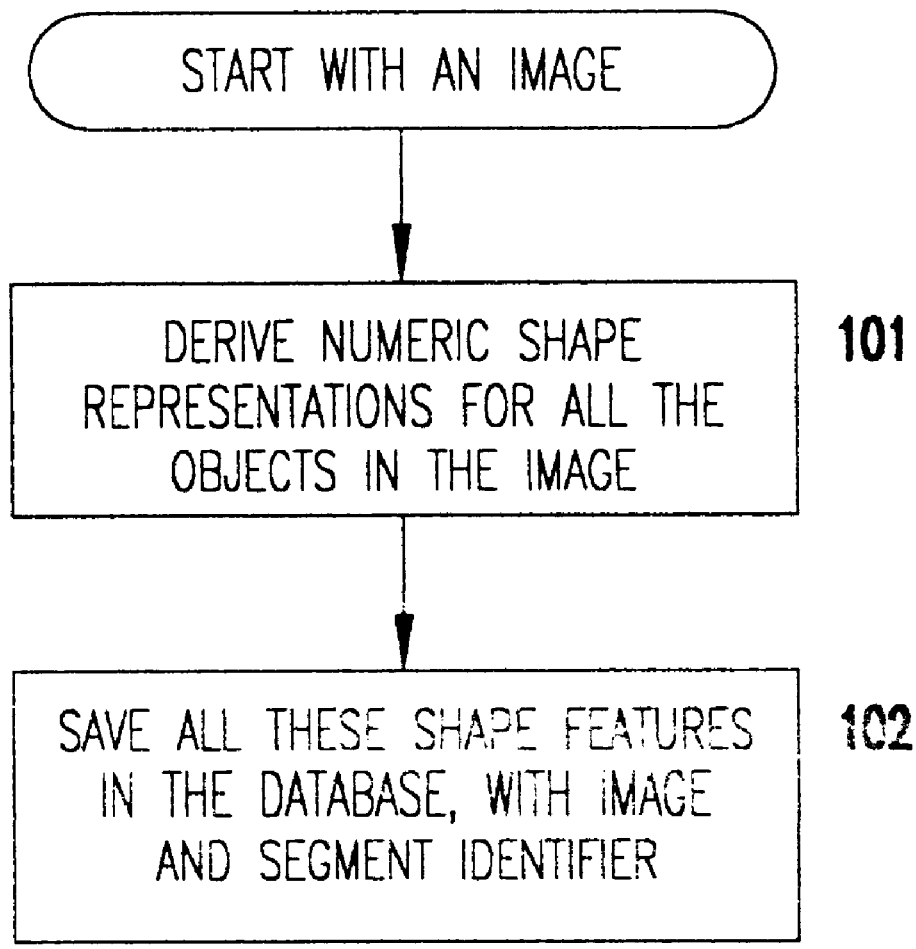
FIG. 1 is a flow diagram of the procedure to put the numeric vectors representing shapes of objects in the images into the shape database.

Referring now to the drawings, and more particularly to FIG. 1, a prior art technique is shown to establish a database of shape descriptors. In block 101, the descriptors of the shape boundary or the shape region are derived and are stored in the database in block 102.

Figure 4:
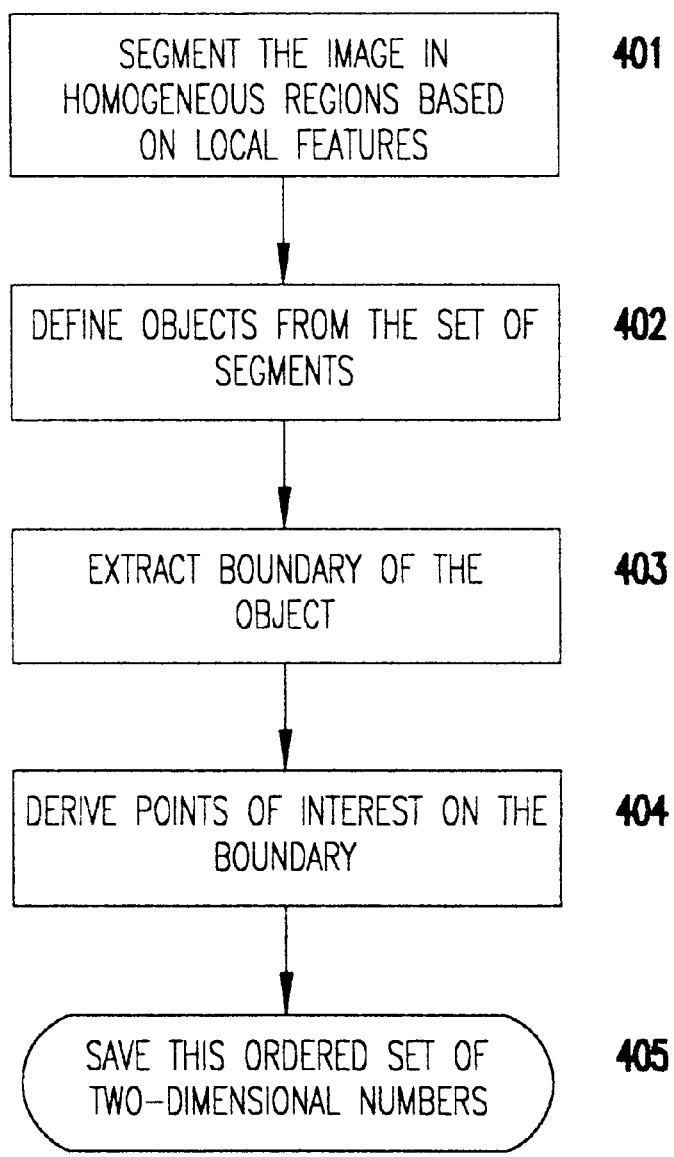
FIG. 4 is a flow diagram of the procedure of extracting the numeric shape descriptors from the object in the image.

Extraction of the shape descriptors from the image is described in the FIG. 4. The image is first segmented into regions according to homogeneity of some distinctive local feature, such as color or texture, in block 401. In an off-line process, for example during the insertion into the database, every segment is assumed to represent an object in block 402. The object is thus a set of connected pixels, and pixels which lie on the boundary can be extracted in block 403. Now the points of interest on this boundary are derived in block 404. These points are generally taken to be the high curvature points on the boundary or could be the points, which when joined as a polygon, approximately represent the region. This ordered set of two-dimensional points represent the shape. For simplicity we shall assume that these points are written as complex numbers. Thus, the shape is represented by an ordered set of N complex numbers $(x_1, x_2, \ldots, x_N)$. The shape descriptors like Fourier descriptors or moment invariants are derived from these points and are kept in the database in block 405. Generally, the database is organized such that to find similar shapes sequential search of all the shape descriptors is obviated, but that is beyond the scope of this invention.

We anticipate that our invention will be put to specific use in the following three scenarios. Other uses can be expected to emerge in due course.

Usefully Enlarging Image Database Queries

If a user indicates an interest in an object, a possible strategy to determine the search space for a database search is to show him or her additional objects and elicit responses. Current technology makes limited use of the original object in this scheme and relies on defining a notion of similar objects. This is subjective at best and misleading in many cases. The user may have a notion of similarity quite distinct from that of the computer. More comprehensive searches may become slow and cumbersome. A better strategy would be to modify the original object and gauge user preferences from a range of deformations. Once a user flags a deformation, a similar object is automatically generated and added to the search space. Multiple iterations of this process can lead to very refined searches, all without invoking other images or objects.

Figure 2:
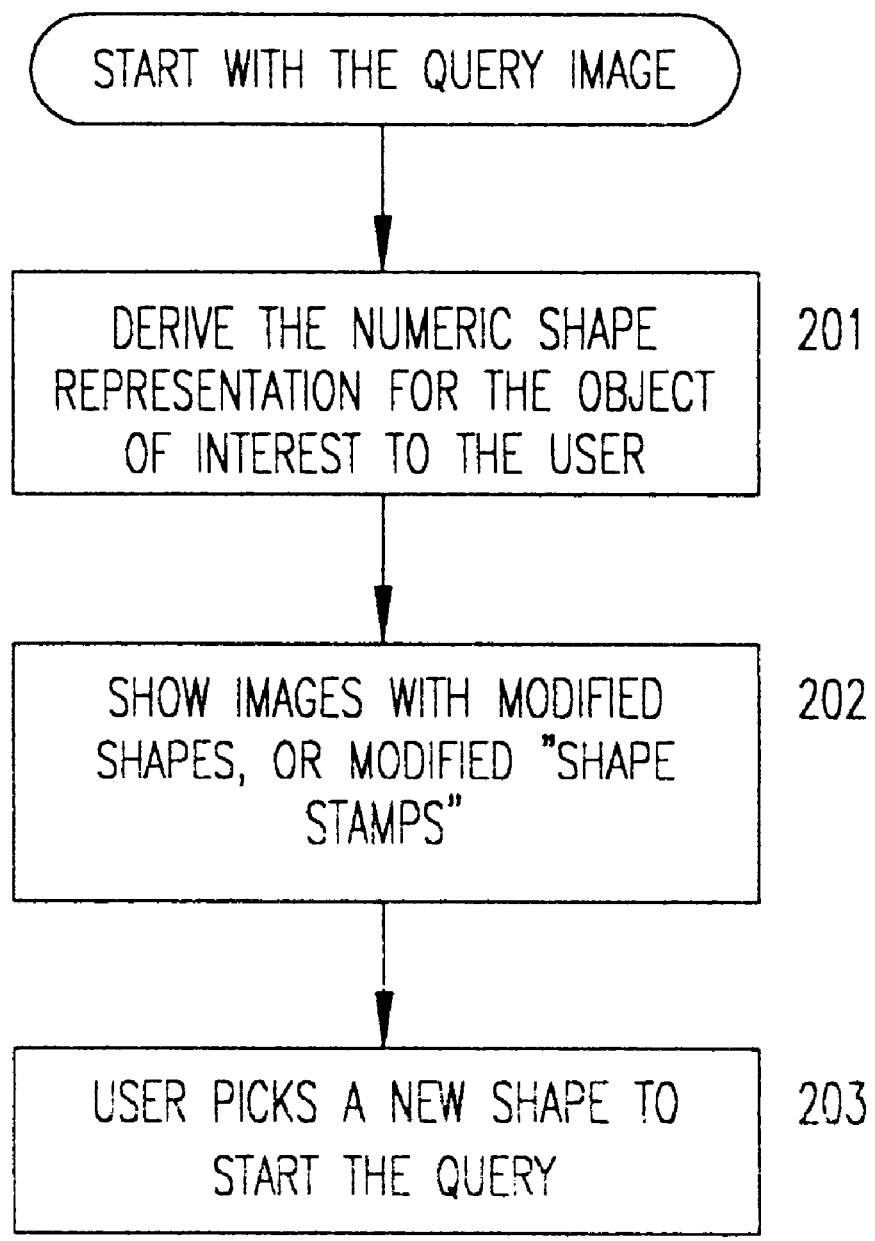
FIG. 2 is a flow diagram of the procedure of modifying the shape of the object with which user starts the search.

FIG. 2 shows an implementation of the idea suggested in the last paragraph. The user starts with a query image or, alternatively, draws a boundary. The numeric shape representation for the object of interest to the user is derived in block 201. The user is shown various modified shapes and he or she can pick one or more of them in block 202. The shape modification is done according to FIG. 5, and is the principal contribution of this invention, and shall be described in detail later. The user then picks a new shape to start the query in block 203. The database search is performed based on the shapes which user picked.

Learning User Perceptions of Symnetry and Detail

Visual interpretation of objects relies on two major perceptions: (i) symmetry, wherein the user decides on what the global symmetries of the object are, and (ii) detail, wherein the user decided on what the local details of the object are. This global/local duality can be easily captured by our invention. Macrofeatures are designed to capture symmetries. Their deformations are thus symmetry-breakers. Deformations that the user does not like are those that break the symmetries he or she perceives as important. Microfeatures capture detail. If detail is of importance to the user, then all deformations will influence him or her roughly equally. If the implementation of the invention allows for partial addition of local features, we can even learn the extent detail drives the user's likes and dislikes. A specific implementation could be as follows: A user can be shown a fixed set of deformations for a variety of shapes. We then record his or her likes and dislikes for each object. The commonality in these likes and dislikes quantifies the users perception of symmetry and detail. A personalized object search engine can then be developed for this user.

Figure 3:
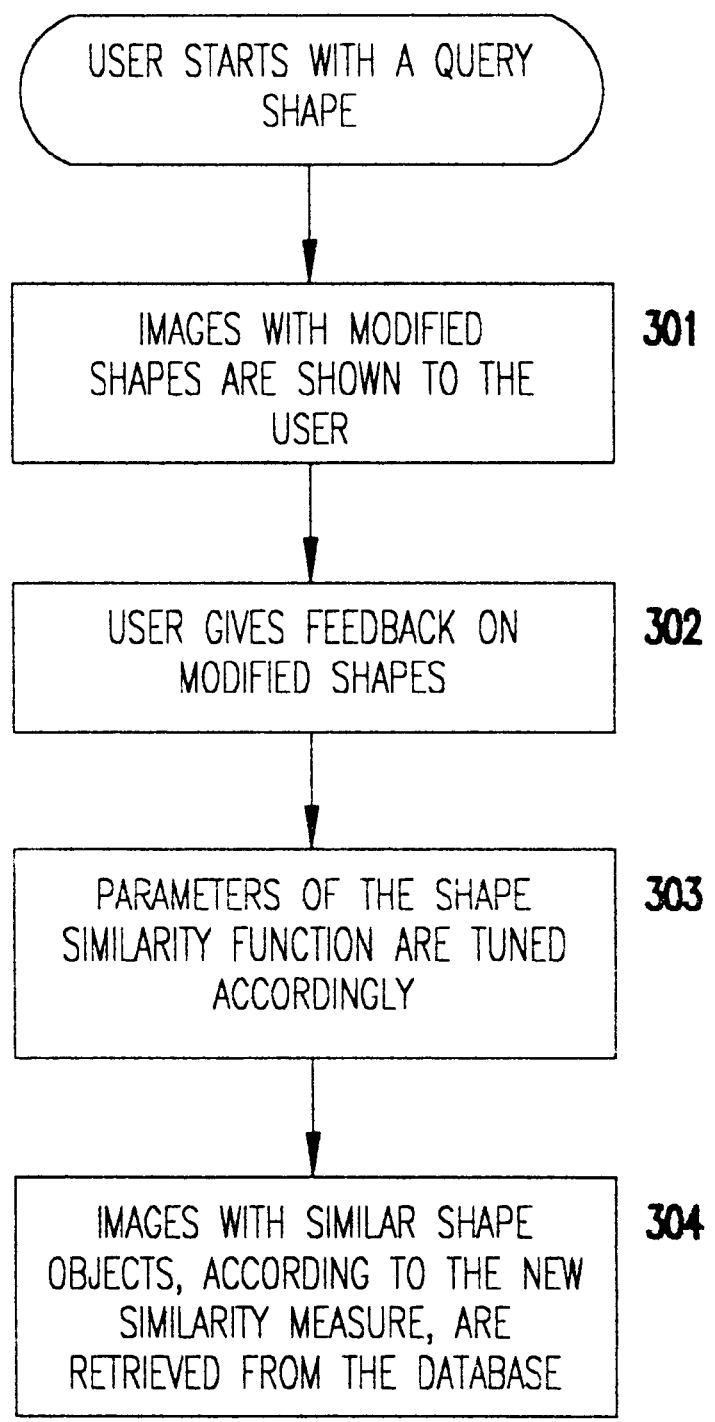
FIG. 3 is a flow diagram of the procedure, where user is shown many deformed shapes and by taking user's feedback on the modifications, the computer tunes the parameters of the shape similarity measure.

In FIG. 3, we show how the system can learn the measure of shape similarity according to the perception of the user. Prior art techniques extract similar shapes from the database and user's feedback is taken on these shapes. Parameters of the similarity measure are then learned from the feedback, which the user has given. Details of this procedure can be found in "Relevance Feedback: A Power Tool for Interactive Content-Based Image Retrieval", by Yong Rui, Thomas S. Huang, Michael Ortega, Sharad Mehrotra, *IEEE Transactions on Circuits and Systems for Video Technology*, Vol. 8, No. 5, September 1998. In this invention we propose that the learning can be done without the need of going to the database. As shown in block 301, we perform controlled shape modifications. The exact procedure of shape modifications is described in FIG. 5, and shall be described later. The user then gives feedback on the objects with modified shapes in block 302. In block 303, parameters of the shape similarity function are tuned according to the user's feedback. The similarity measure learning is done as described in the reference cited. This new similarity measure is then used to find similar images from the database in block 304.

Developing Compressed Template Object Libraries

It would be a great advantage if one could store a single image of a tree in a object database and generate all conceivable views of all possible trees from this single object. Given the numbers and complexities involved, such compression currently appears unfeasible. However, our invention can reduce the burden substantially. Although we cannot transform detail (nor do we want to), we can still generate symmetries and global characteristics from single objects. For example, we can define our macrofeatures and sub-sampling to capture perspective transformations. This implies that we can generate many camera angles for our object. What we can then store is the object itself, not how it is viewed. A change in the sub-sampling scheme can generate other such symmetries. This highlights the power of the multi-resolution strategy described earlier.

All these applications can, in principle, be combined into a system that teams user perception, creates compressed libraries, and then carries out efficient searches. Such a product is one possible utilization of this invention.

Figure 5:
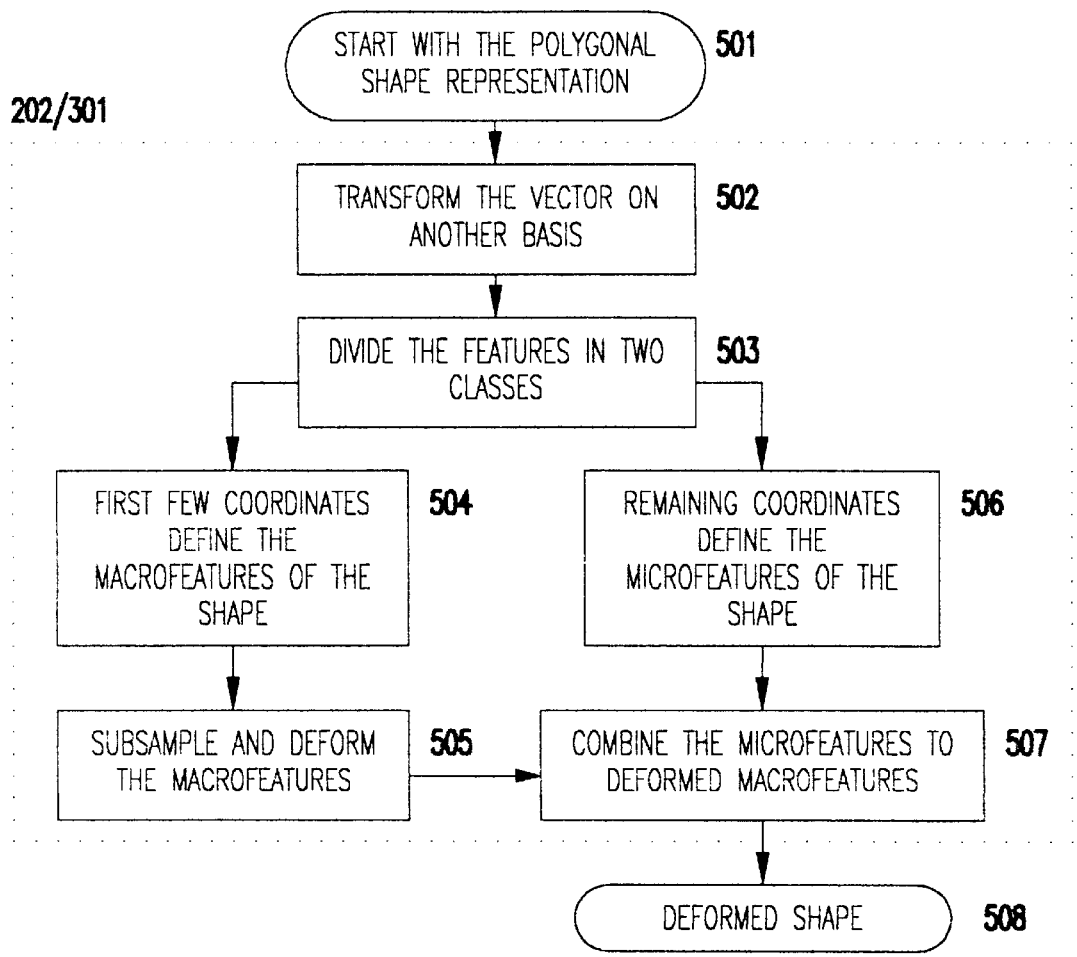
FIG. 5 is a flow diagram of the procedure to deform the shape of an object showing how the shape features are divided into two parts called macrofeatures and microfeatures, with deformation being done only along macrofeature dimensions.

FIG. 5, shows the proposed method of shape deformation. The shape feature vector is extracted from the shape in input block 501, as shown in FIG. 4. Then the feature vector is transformed into another domain in block 502. In our embodiment, we take this to be the Fourier domain. In general, it can be any linear or non-linear, but invertible, transformation. The features are divided into two classes in block 503. The first few coordinates of the transformed features are taken in block 504. These coordinates define the macrofeatures or global features of the shape. We then sub-sample and deform the macrofeatures in block 505. The remaining coordinates define the microfeatures of the shape in block 506. The deformed macrofeatures from block 505 are combined with the microfeatures in block 507 to produce the deformed shape in output block 508.

Modifying Object Shapes in Image Manipulation Programs

The proposed method of image shape modification in FIG. 5 can find applications in user driven image manipulation programs. When the user is interested in modifying the shape of an object of interest, the manipulation program can assist the user by performing modifications according to the method of FIG. 5. The parameters of the shape modification method, for example, the number of macrofeatures, can be either given by the user or determined by the program.

Figure 6:
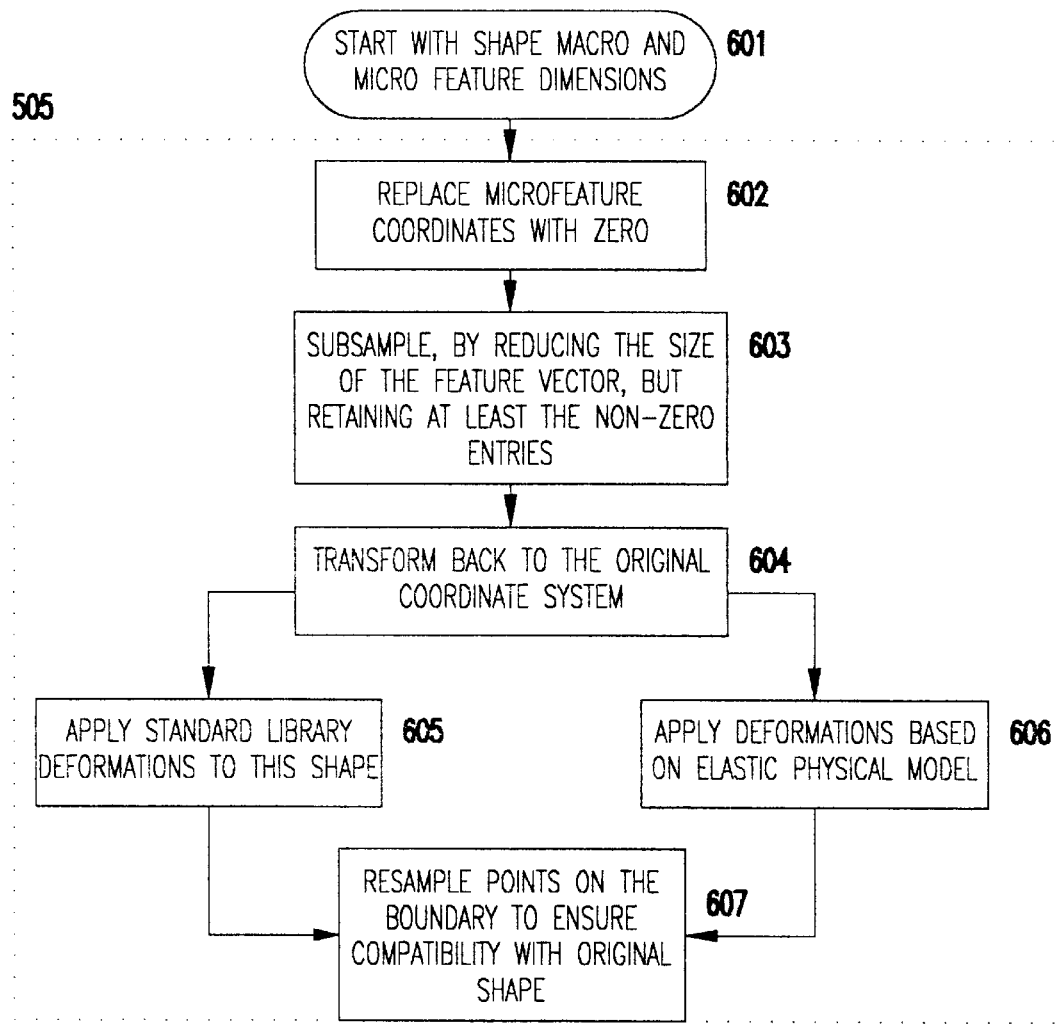
FIG. 6 is a flow diagram of the procedure to deform the macrofeatures; of the shape.

FIG. 6 shows the process of macrofeature modification in detail. The process starts with the shape macrofeature and microfeature dimensions in input block 601. We can reconstruct an approximate shape from these features by setting the microfeature values to zero in block 602. Next, in block 603, we sub-sample, by reducing the size of the feature vector, but retain at least the non-zero entries, and then transform it back to the original coordinate system in block 604.

Figure 7:
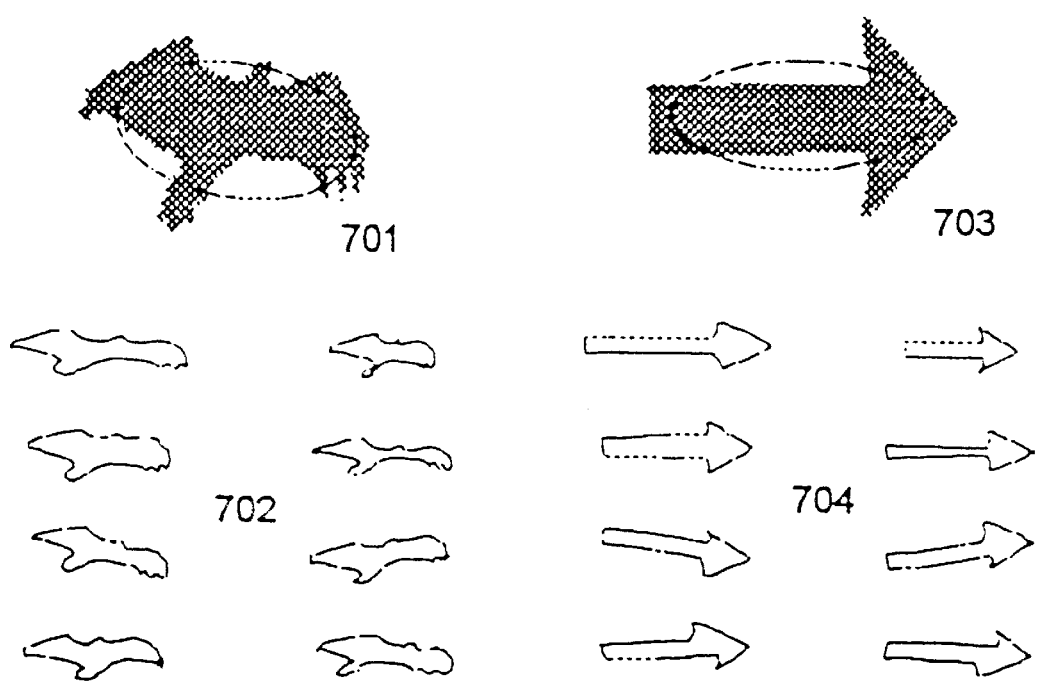
FIG. 7 is an illustration of shape deformation examples.
Figure 8:
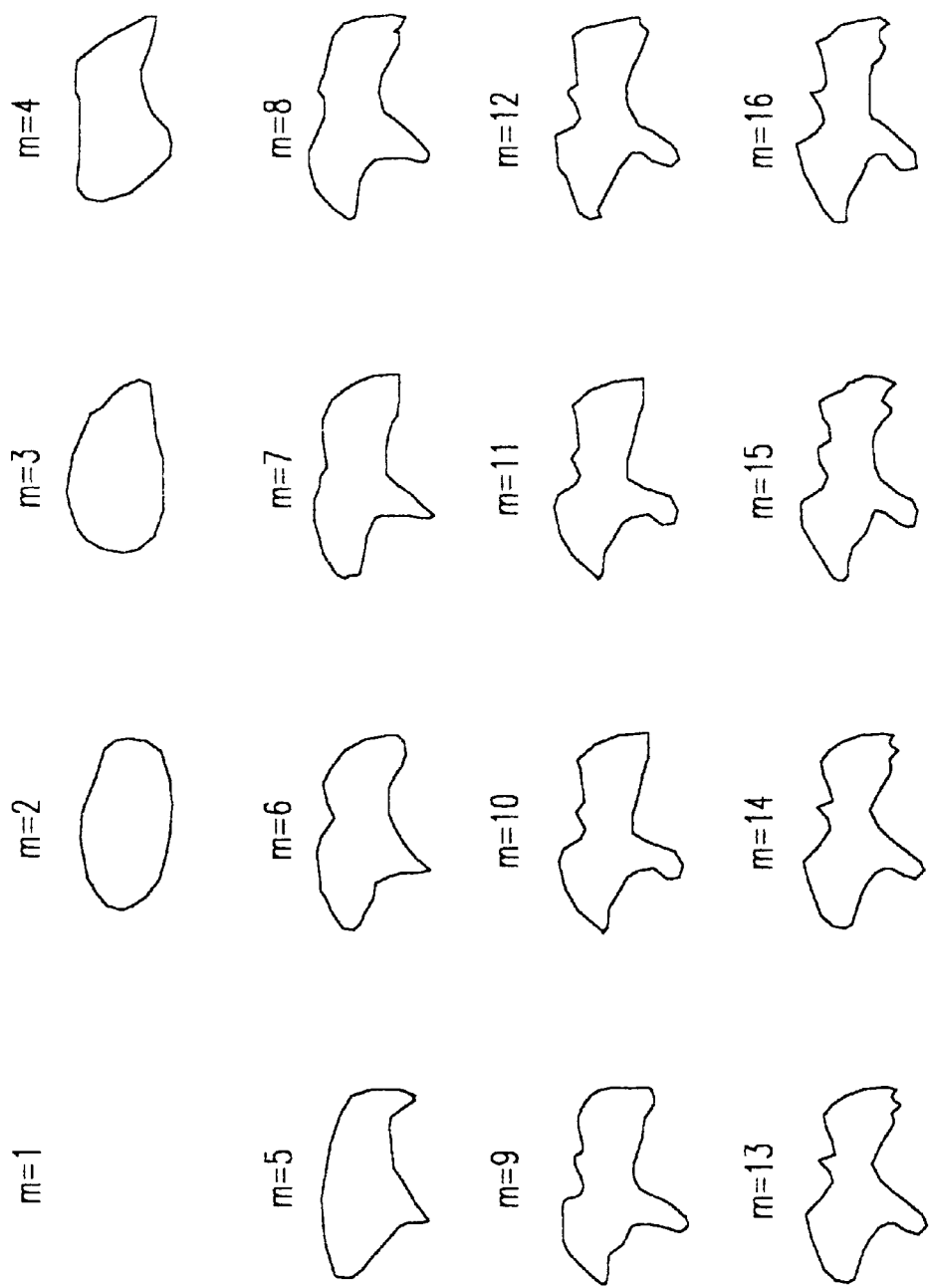
FIG. 8 is an illustration of macrofeatures of a shape with increasing numbers of Fourier coefficients.

FIG. 7 shows a shape and its global representative shape, which is reconstructed by taking the first two Fourier coefficients. In block 605, this global shape is then modified using some defined set of rules. For example, in FIG. 7, we deform the shape in the following eight ways: (1) increase the major axis, (2) decrease the major axis, (3) increase the minor axis, (4) decrease the minor axis, (5) increase the angle between the major and minor axes, (6) decrease the angle between the major and minor axes, (7) increase the angle of the starting point, and (8) decrease the angle of the starting point. Alternatively, in block 606, the shape can be deformed in the directions of modal deformations, discussed earlier. The amount of deformation in this method can be controlled by reducing the number of points, which are considered for deformation. This sub-sampling in block 603 can be used to create multi-resolutions of shape deformations. The deformed shape is then re-sampled in block 607, so that it contains exactly same number of points as the original shape. Block 507 in FIG. 5 combines this deformed shape with the microfeatures to create the deformed shape.

FIG. 7 shows an example of the shape deformation implementation. Gray regions 701 and 703 are the original shapes extracted from an image of an eagle and a highway sign, respectively. The ellipse-like curve over the shape denotes the macrofeature, which we get after setting the higher order terms in the Fourier transform to zero. The macrofeature is then modified in the following eight manners: (1,2) increasing and decreasing the major axis, (3,4) increasing and decreasing the minor axis, (5,6) increasing and decreasing the angle between the major and minor axis, and (7,8) increasing and decreasing the phase shift. The microfeatures are then added to the deformations to obtain the deformed shapes in 702 and 704 for the eagle and highway sign, respectively.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of representation of shape of objects in an image, comprising the steps of:

transforming image shape feature vectors from an original coordinate system into another domain coordinate system;

dividing the image in two parts, macrofeatures, which are represented by a first few coordinates of the transformed vectors and is a global part of the shape of the image, and microfeatures, which are the remaining coordinates and is a local part of the shape of the image; and deforming only the macrofeatures and combining the deformed macrofeatures with the microfeatures to obtain a deformed object.

2. A method of representation of shape of objects in an image as recited in claim 1, wherein the parameters of the image division are derived from a user input.

3. The method of representation of shape of objects in an image as recited in claim 1, wherein the step of deforming comprises the steps of:

modifying only the macrofeature part of the shape by increasing a major axis of the macrofeature, decreasing the major axis, increasing a minor axis of the macrofeature, decreasing the minor axis, increasing an angle between the major and minor axes, decreasing the angle between the major and minor axes, increasing an angle of a starting point, and decreasing the angle of the starting point; and adding the local part of the shape without modification to the modified macrofeature part of the shape.

4. A method of representation of shape of objects in an image as recited in claim 3, wherein the parameters of the image division are derived from a user input.

5. The method of representation of shape of objects in an image as recited in claim 1, wherein the step of deforming comprises the steps of:

modifying only the macrofeature part of the shape with the parameters derived from a user input; and adding the local part of the shape without modifications to the modified macrofeatures part of the shape.

6. A method of representation of shape of objects in an image as recited in claim 5, wherein the parameters of the image division are derived from a user input.

7. The method of representation of shape of objects in an image as recited in claim 3, for use in procedures of image manipulation, further comprising the steps of:

transforming the sum of the local part of the shape and the modified macrofeatures part of the shape to the original coordinate system; and displaying a resulting deformed image to a user.

8. The method of representation of shape of objects in an image recited in claim 3, for use in procedures of image manipulation, further comprising the steps of:

transforming the sum of the local part of the shape and the modified macrofeature part of the shape to the original coordinate system;

displaying a resulting deformed image to a user; and iteratively modifying the shape by taking the user's feedback on the shape deformation.

9. The method of representation of shape of objects in an image as recited in claim 1, further comprising the step of creating a shape deformation library by taking one shape and inserting deformed ones.

10. The method of representation of shape of objects in an image as recited in claim 1, further comprising the step of compressing a shape database by storing a representative shape for a class of shapes and the degrees of deformation required to generate members of the class.

11. The method of representation of shape of objects in an image as recited in claim 1, further comprising the step of classifying shape objects using the user's feedback on shape deformations.

12. The method of representation of shape of objects in an image as recited in claim 1, wherein said another domain coordinate system is a Fourier basis coordinate system.

13. A method of content and shape based image retrieval comprising the steps of:

transforming image shape feature vectors from an original coordinate system into another domain coordinate system;

dividing the image in two parts, macrofeatures, which are represented by a first few coordinates of the transformed vectors and is a global part of the shape of the image, and microfeatures, which are the remaining coordinates and is a local part of the shape of the image;

modifying only the macrofeature part of the shape;

adding the local part of the shape without modification to the modified macrofeature part of the shape;

transforming the sum of the local part of the shape and the modified macrofeature part of the shape to the original coordinate system;

displaying a resulting deformed image to a user; and allowing the user to replace the shape of an original object with one of the deformed shapes, with which he or she starts a database query.

14. A method of content and shape based image retrieval comprising the steps of:

transforming image shape feature vectors from an original coordinate system into another domain coordinate system;

dividing the image in two parts, macrofeatures, which are represented by a first few coordinates of the transformed vectors and is a global part of the shape of the image, and microfeatures, which are the remaining coordinates and is a local part of the shape of the image;

modifying only the macrofeature part of the shape;

adding the local part of the shape without modification to the modified macrofeature part of the shape;

transforming the sum of the local part of the shape and the modified macrofeature part of the shape to the original coordinate system;

displaying one or more resulting deformed image to a user; and taking the user's feedback on the shape deformations to learn his or her perception of similarity of two shapes to modify parameters of shape similarity measure.

* * * * *